(12) United States Patent  (10) Patent No.: US 7,704,132 B2
Luthi et al.  (45) Date of Patent: Apr. 27, 2010

(54) DEVICE FOR CARVING, BONING, AND DEFATTING SLAUGHTERED ANIMALS

(75) Inventors: Paul Luthi, Rome, GA (US); Hans Isenschmid, Schinznach-Dorf (CH)

(73) Assignee: SUHNER Inter-Trade AG, Baar (CH)

( * ) Notice: Subject to any disclaimer, the term of this patent is extended or adjusted under 35 U.S.C. 154(b) by 0 days.

(21) Appl. No.: 12/391,525

(22) Filed: Feb. 24, 2009

(65) Prior Publication Data

US 2009/0227192 A1 Sep. 10, 2009

(30) Foreign Application Priority Data

Mar. 4, 2008  (CH) .................................. 00315/08

(51) Int. Cl.
*A22C 17/00* (2006.01)
(52) U.S. Cl. ...................................................... 452/137
(58) Field of Classification Search ................ 452/132, 452/133, 137; 30/276, 340
See application file for complete search history.

(56) References Cited

U.S. PATENT DOCUMENTS

| 4,590,676 | A | * | 5/1986 | Bettcher | 30/276 |
| 4,637,140 | A | | 1/1987 | Bettcher | |
| 4,702,006 | A | * | 10/1987 | McCullough | 30/276 |
| 4,850,111 | A | * | 7/1989 | McCullough | 30/276 |
| 4,854,046 | A | * | 8/1989 | Decker et al. | 452/149 |
| 4,894,915 | A | * | 1/1990 | Decker et al. | 30/276 |
| 5,692,307 | A | * | 12/1997 | Whited et al. | 30/276 |
| 5,940,972 | A | * | 8/1999 | Baris et al. | 30/276 |
| 6,751,872 | B1 | * | 6/2004 | Whited et al. | 30/276 |

* cited by examiner

*Primary Examiner*—Thomas Price
(74) *Attorney, Agent, or Firm*—Volpe and Koenig, P.C.

(57) ABSTRACT

A device (1) for carving, boning, and defatting slaughtered animals is provided having a handle (3), with a head part (9) mounted at its front end. The head part (9) carries a knife carrier (21) with a rotatably mounted circular knife (17). The knife carrier (21) can be connected to the head part (9) via guiding cams (27) which are inserted into recesses (29) at the head part (9).

4 Claims, 3 Drawing Sheets

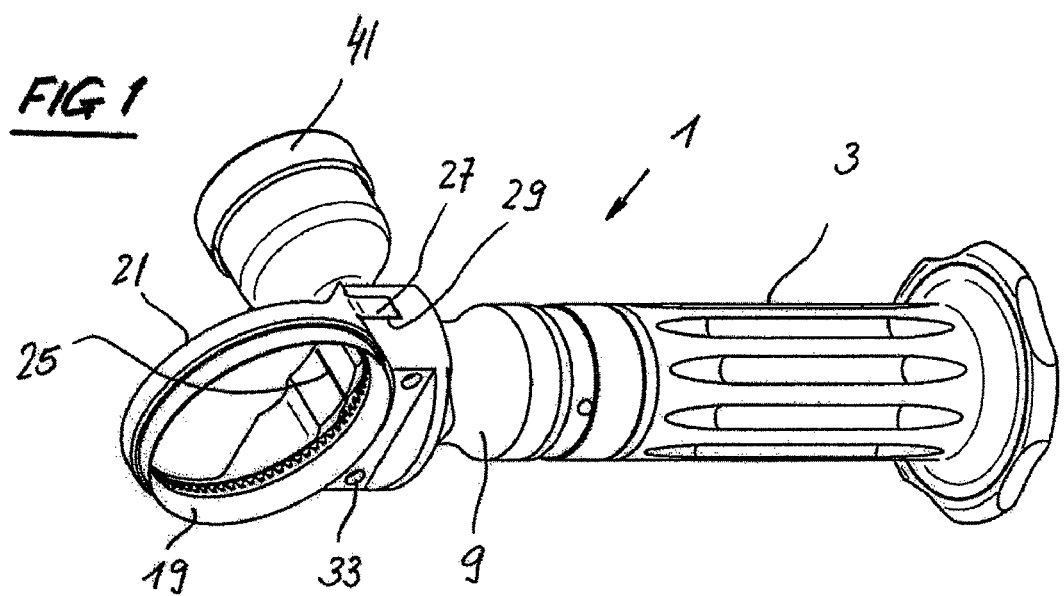
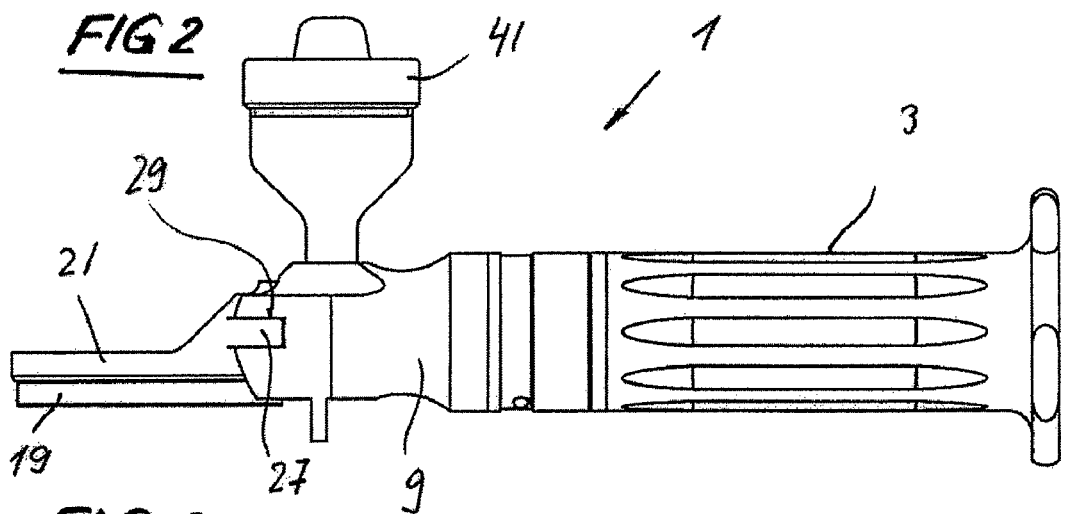
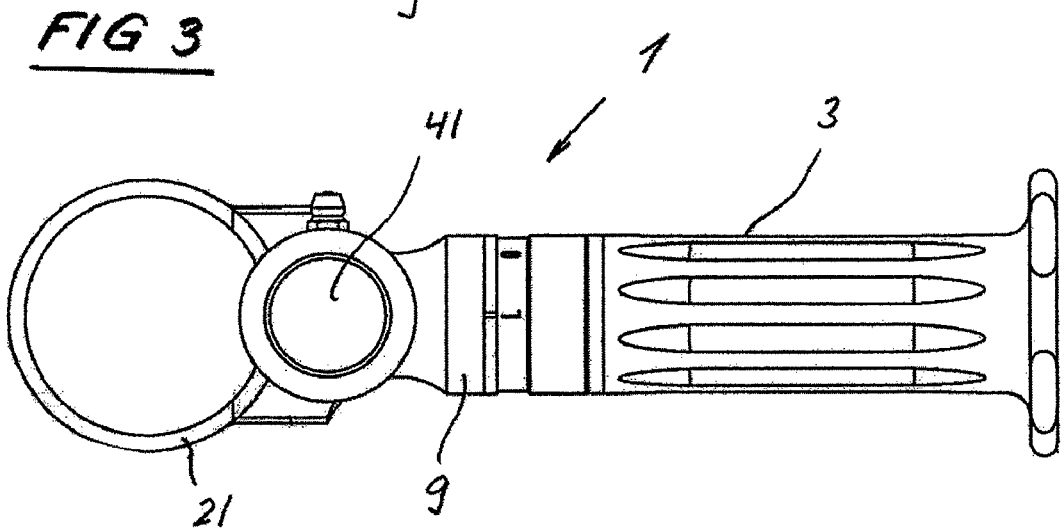

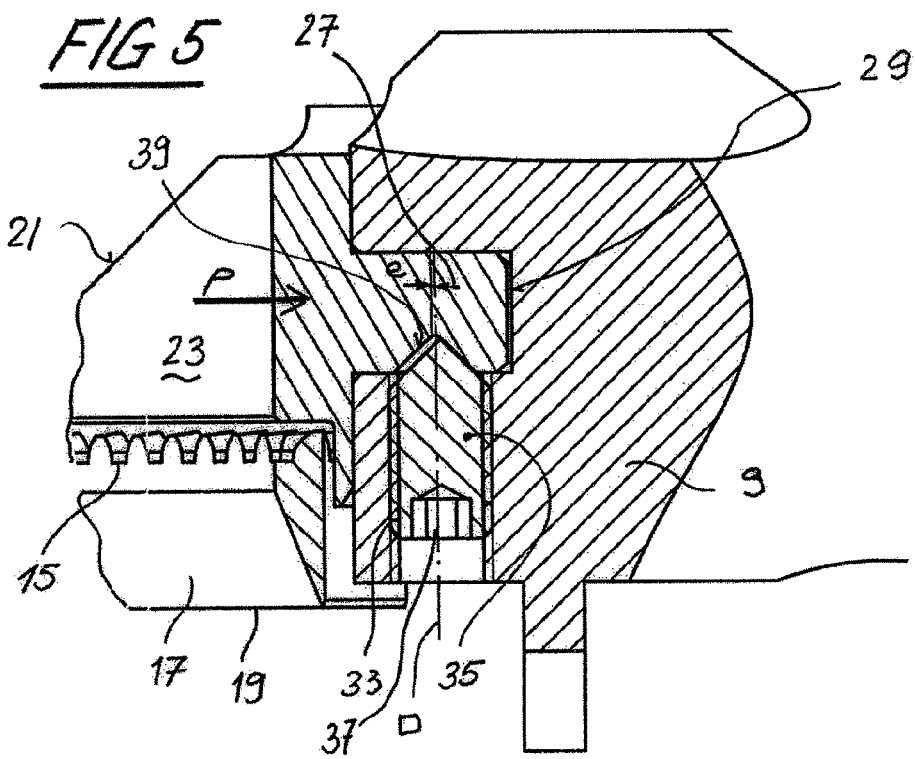
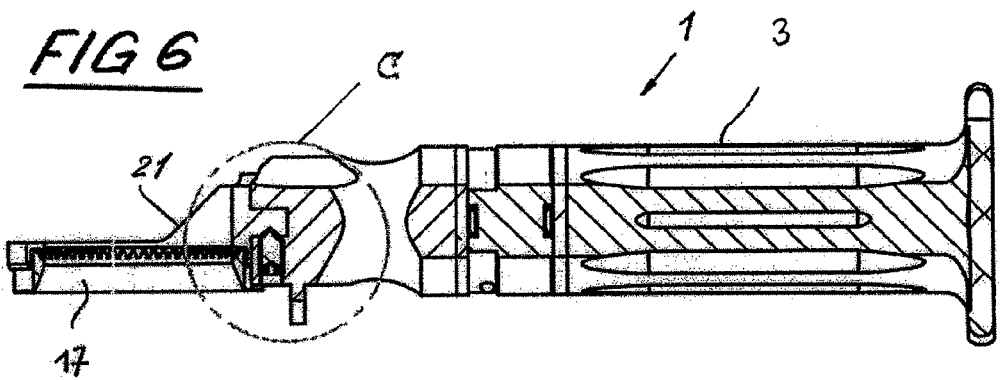
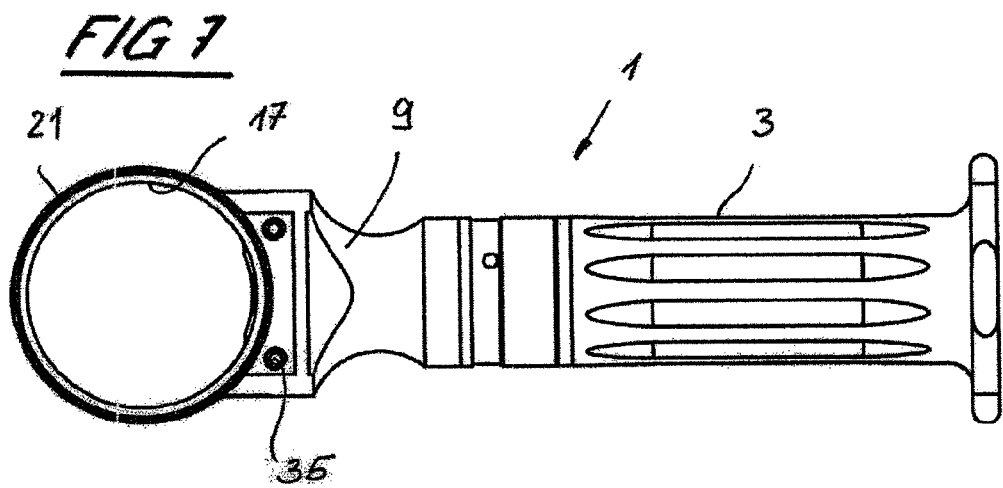

DEVICE FOR CARVING, BONING, AND DEFATTING SLAUGHTERED ANIMALS

CROSS-REFERENCE TO RELATED APPLICATIONS

This application claims the benefit of Swiss APPLICATION No. 00315/08, filed Mar. 4, 2008, which is incorporated herein by reference as if fully set forth.

The invention is directed to a device for carving, boning, and defatting slaughtered animals.

Devices of the above-mentioned type are also known as trimmers. They comprise a handle, which may also contain the driving motor, a flange-connected head part, which may contain a transmission depending on the type of motor drive, and a knife carrier, which can be separated from the head part in order to periodically allow a quick exchange of the circular knife rotating in the knife carrier. In the known devices, the connection between the knife carrier and the head part occurs via two screws, which at the side of the knife can be screwed into threaded bores provided in the head part. The screw heads are then positioned on a flange projecting upwards from the knife carrier and can only be loosened and fixed from this side using a screw driver. For this purpose, bores or slots are provided in the knife carrier, which align it to the screw shafts with regard to the head part. This type of mounting fulfills its purpose, however it is unsatisfactory, because on the one hand an inexpensive precise positioning of the knife carrier on the head part is impossible and on the other hand manipulations must be performed in the area of the knife blade (cf. U.S. Pat. No. 4,637,140).

SUMMARY

The object of the present invention is to provide a device in which the knife carrier can be connected precisely and quickly to the head part in a reproducible manner and can be clamped and stressed thereupon. Another object of the invention is to create a clamping device outside the knife.

This object is attained in a device according to the invention. Advantageous embodiments of the device are described in greater detail below and are recited in the claims.

By the plug connection between the knife carrier and the head part and by the suitable embodiment of at least one guiding cam it is possible to fasten the knife carrier to the head part in a precisely positioned fashion at all times. The locking can occur by a screw or another fastening element exerting a tensile force upon the knife carrier.

BRIEF DESCRIPTION OF THE DRAWINGS

Using an illustrated exemplary embodiment the invention is explained in greater detail. Shown are:

FIG. 1 is a perspective view of the device from the bottom,

FIG. 2 is a side view of the device in FIG. 1,

FIG. 3 is a top view of the device in FIG. 1,

FIG. 5 is a cross-section through the knife carrier, shown enlarged, and the head part of the device (section C), FIG. 6 is a side view of the device, with the head part partially cross-sectioned, FIG. 7 is a view of the device from the bottom.

DETAILED DESCRIPTION OF THE PREFERRED EMBODIMENT

Figure 4:
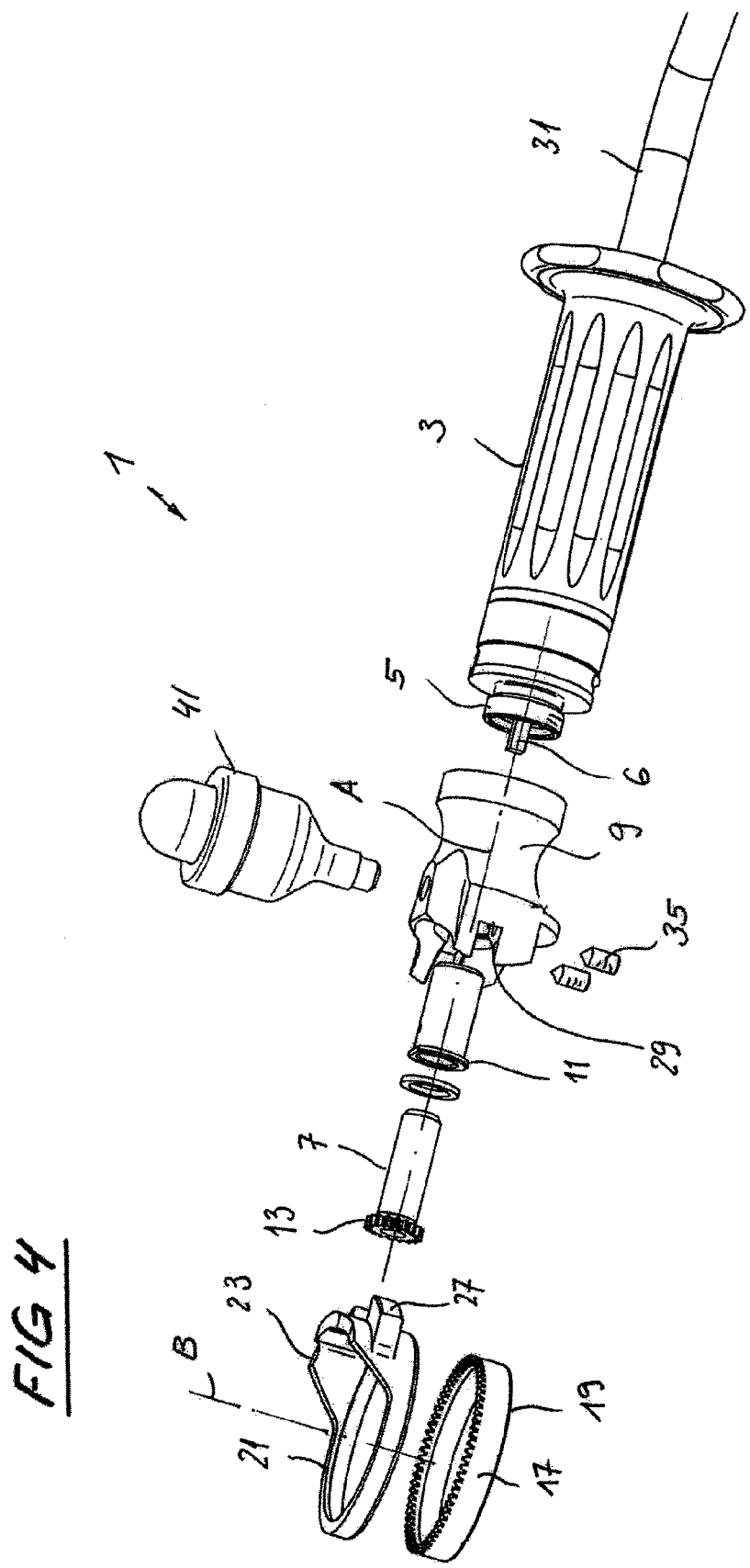
FIG. 4 is an exploded view of the essential parts of the device.

In FIGS. 1 through 4 the reference character 1 indicates a device for carving, boning, and defatting slaughtered animals. It comprises, beginning at the right side of the drawing, a handle 3 by which the device 1 is held by an operator. A drive (e.g., electric motor, pneumatic motor) is encompassed by the handle 3 or it encloses the end of a flexible shaft, not shown, which is connected to an external electric motor, not shown either. At the front end of the handle 3 a drive shaft 6 is shown, in which a pinion shaft 7 can be slipped-on or coupled. The pinion shaft 7 is rotatably mounted in a bushing 11 in the head part 9. A gear 13 is located at the front end of the pinion shaft 7. With the teeth 15 the gear 13 engages the upper edge of a circular knife 17. A circular blade 19 is provided on the knife 17 opposite the teeth 15. The knife 17 is rotatably mounted in a knife carrier 21. For this purpose, the knife carrier 21 is slotted in the area of the cylindrical flange 23, which is extended upwards. This means, the circularly embodied front part of the knife carrier 21 is divided by a slot 25 in the area of the flange 23. The slot 25 allows a slight spreading of the knife carrier 21 for exchanging the rotatably mounted knife 19.

A guiding cam 27 is formed at the periphery of the flange 23. The cross-section of at least one guiding cam 27 is preferably polygonal, for example rectangular; it could also be oval (FIG. 5.)

A congruent recess 29 is located in the head part 9, e.g., in the form of a horizontal slot in the head part 9, to accept at least one guiding cam 27, preferably two guiding cams 27. The two recesses 29 extending laterally in the head part 9 guide the two guiding cams 27 in the horizontal and vertical direction and position the head part such that when the guiding cams 27 are inserted into the recesses 29, produced within narrow tolerances, the rotary axis A of the pinion shaft 7 precisely intersects the rotary axis B of the knife 17 at one point.

In the head part 9, threaded bores 33 extend to the recess 29 at a right angle in reference to the upper and lower boundary surfaces. The threaded bores accept screws 35, which have their front end conically formed and include a hexagon socket 37, for example, at the back end. As a counterpart to the conical end of the screws 35, conical bores 39 are located in the guiding cams 27 or an oblique part, extending diagonally in reference to the horizontal, is provided in the form of a v-shaped groove, namely such that when the guiding cams 27 are completely inserted into the recesses 29 the rotary axis D of the screw 35 is positioned at a distance e from the axis of symmetry of the conical bore 39 or intersects it at an oblique part. This causes the knife carrier 21 to be pushed in the direction of the arrow P when the screws 35 are screwed into the threaded bore 33, and thus clamps the knife carrier in the recess 29 without any play. Small errors in tolerance during manufacturing, both with regard to the head part 9 as well as the knife carrier 21, are compensated thereby. An assembly of the knife carrier 21 without any play is therefore possible at all times. The operator only needs to partially unscrew the screws 35 when changing knifes, to pull off the knife carrier 21, and after the exchange of knifes to proceed in the opposite order.

The figures also show a grease container 41 for lubricating the rotating knife 19 in the knife carrier 21.

LEGEND 1 device
3 handle
5 thread
6 driven shaft
7 pinion shaft
9 head part
11 bushing
13 gear
15 teeth
17 knife
19 blade
21 knife carrier
23 flange
25 slot
27 guiding cam
29 recess
31 flexible cam
33 threaded bore
35 screws
37 hexagon socket
39 conical bore
41 grease container

The invention claimed is:

1. A device (1) for carving, boning, and defatting slaughtered animals, comprising a drive part with a flange-connected head part (9) connected to a drive shaft (6), a knife carrier (21) for an exchangeable rotating cylindrical knife (17) that is connected to the flange-connected head part (9), at least one guiding cam (27) is provided as a connection element on the knife carrier (21), that is insertable into a recess (29) of the head part (9) and is clampable there via a tension element (35), and a threaded bore (33) for the tension element (35) opens into the recess (29) in the head part (9).

2. A device according to claim 1, wherein the at least one guiding cam (27) has a polygonal or round cross-section and the recess (29) has a cross-section congruent in reference to the guiding cam (27).

3. A device according to claim 1, wherein a conical bore (39) is located in the at least one guiding cam (27) or that a v-shaped groove is located on the at least one guiding cam (27).

4. A device according to claim 3, wherein an axis of symmetry (D) of the conical bore (39) is positioned eccentrically in reference to the threaded bore (33) for the tension element in the head part (9).

* * * * *